(12) United States Patent
Sugita

(10) Patent No.: US 7,589,905 B2
(45) Date of Patent: Sep. 15, 2009

(54) OPTICAL SYSTEM AND OPTICAL APPARATUS INCLUDING THE SAME

(75) Inventor: Shigenobu Sugita, Shimotsuke (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/323,470

(22) Filed: Nov. 26, 2008

(65) Prior Publication Data

US 2009/0168192 A1    Jul. 2, 2009

(30) Foreign Application Priority Data

Dec. 28, 2007    (JP)    ............... 2007-339240

(51) Int. Cl.
*G02B 15/15*    (2006.01)
(52) U.S. Cl. ............... 359/677; 359/432; 359/676
(58) Field of Classification Search ............ 359/432, 359/676, 677
See application file for complete search history.

(56) References Cited

U.S. PATENT DOCUMENTS

| 6,621,645 | B2 | 9/2003 | Sato |
| 7,079,324 | B2 | 7/2006 | Yamasaki |
| 7,433,130 | B2 * | 10/2008 | Sugita ............... 359/679 |

FOREIGN PATENT DOCUMENTS

| JP | 2001-159732 | 6/2001 |
| JP | 2001-166206 | 6/2001 |
| JP | 2001-188171 | 7/2001 |
| JP | 2006-084971 | 3/2006 |

* cited by examiner

*Primary Examiner*—Joseph Martinez
(74) *Attorney, Agent, or Firm*—Canon USA Inc IP Div

(57) ABSTRACT

An optical system includes a first negative lens element disposed nearest a front side and a first positive lens element whose front surface resides within a distance 0.4 L from the surface nearest the front side toward a rear side of the optical system having a total lens length L. By appropriately determining the materials for the two lens elements, the optical system realizes a wide angle of view while correcting lateral chromatic aberration well.

7 Claims, 11 Drawing Sheets

OPTICAL SYSTEM AND OPTICAL APPARATUS INCLUDING THE SAME

BACKGROUND OF THE INVENTION

1. Field of the Invention

The present invention relates to optical systems and is suitable for optical systems included in optical apparatuses such as silver-halide-film cameras, digital still cameras, video cameras, digital video cameras, telescopes, binoculars, projectors, and photocopiers.

2. Description of the Related Art

Optical systems included in optical apparatuses such as digital cameras, video cameras, and projectors are desired to have a wide angle of view and form a high-quality image without distortion.

Wide-angle lens systems are known as optical systems suitable for obtaining an object-side image of a wide range in a natural state without distortion. In a wide-angle lens system known as a so-called normal-projection, wide-angle lens system, when the image height, the focal length of the system, and the angle of view (an angle at which an object is viewed along an optical axis) are denoted as Y', f, and ω, respectively, the following relationship is satisfied: $Y'=f \cdot \tan \omega$.

Usually, to effectively realize a wide angle of view, a wide-angle lens system includes a negative lens element or a negative lens unit (in Background of the Invention, lens element and lens units are collectively referred to as "lenses") having a strong negative power (refractive power) near a magnification-conjugate side. To widen the angle of view in a lens system having such a configuration, the negative power of the negative lens needs to be increased.

In general, as the power of the negative lens is increased, the degree of negative distortion also increases. Therefore, it becomes difficult to satisfy the relationship of $Y'=f \cdot \tan \omega$.

In contrast, there are normal-projection, super-wide-angle lens systems, such as those disclosed in Japanese Patent Laid-Open Nos. 2001-159732 (corresponding U.S. Pat. No. 6,621,645) and 2001-188171, having an imaging angle of view of $2\omega>100°$. In these lens systems, distortion is effectively corrected by providing an aspherical lens near a negative lens having a strong power.

In the super-wide-angle lens system disclosed in Japanese Patent Laid-Open No. 2001-159732, the negative lens having a strong negative refractive power and provided near the magnification-conjugate side is composed of a material having a high refractive index and a low dispersion. Thus, a wide angle of view is effectively realized while lateral chromatic aberration occurring in a positive lens provided near a demagnification-conjugate side is effectively corrected.

In general, a wide-angle lens system has a configuration in which lenses are arranged asymmetrically, in terms of refractive power, with respect to an aperture stop.

A wide-angle lens system having such an asymmetrical refractive-power arrangement tends to cause large lateral chromatic aberration as well as negative distortion (barrel-shaped distortion).

There are other wide-angle zoom lens systems such as those disclosed in Japanese Patent Laid-Open Nos. 2001- and 2006-084971 (corresponding U.S. Pat. No. 7,079,324). In these zoom lens systems, such lateral chromatic aberration is corrected by using appropriate optical materials.

In the wide-angle zoom lens system disclosed in Japanese Patent Laid-Open No. 2001-166206, a positive lens provided near the demagnification-conjugate side is composed of glass having anomalous partial dispersion so that occurrence of lateral chromatic aberration for short wavelengths is suppressed.

In the zoom lens system disclosed in Japanese Patent Laid-Open No. 2006-084971, a negative lens provided nearest the magnification-conjugate side is composed of a highly refractive material having a large second-order dispersion. This offsets insufficient correction of lateral chromatic aberration for short wavelengths.

Most of currently available highly refractive optical materials having a large second-order dispersion are high-dispersion materials.

If such a material is used, lateral chromatic aberration for wavelengths near the dominant wavelength (the d-line) tends to be overcorrected. Such a tendency is utilized in the zoom lens system disclosed in Japanese Patent Laid-Open No. 2006-084971, in which the positive lens provided nearest the magnification-conjugate side is composed of a high-dispersion material, whereby lateral chromatic aberration for wavelengths near the dominant wavelength is corrected well.

SUMMARY OF THE INVENTION

In light of the above, the present invention provides an optical system capable of correcting lateral chromatic aberration better than in the known optical systems while realizing normal projection well in spite of having a wide angle of view.

According to an aspect of the present invention, an optical system includes a first negative lens element disposed nearest a front side (a magnification-conjugate side), and a first positive lens element whose front surface resides within a distance 0.4 L from a surface nearest the front side toward a rear side (a demagnification-conjugate side) of the optical system having a total lens length L. The first negative lens element and the first positive lens element are composed of appropriate materials.

Further features of the present invention will become apparent from the following description of exemplary embodiments with reference to the attached drawings.

DESCRIPTION OF THE EMBODIMENTS

Embodiments of the optical system and the optical apparatus including the same according to the present invention will now be described.

Optical systems in the embodiments of the present invention are each a retrofocus wide-angle lens system or wide-angle zoom lens system.

Each optical system includes a negative lens element provided nearest a magnification-conjugate side. When the total lens length (a length from a first lens surface to a final lens surface) is denoted as L, the optical system includes at least one positive lens element at least whose surface on the magnification-conjugate side resides within a distance 0.4 L from the surface nearest the magnification-conjugate side toward a demagnification-conjugate side.

The "magnification-conjugate side" is an equivalent of the "object side" in a case where the optical system is used as an imaging optical system included in a camera or the like, or the "projection side (screen side)" in a case where the optical system is used as a projection optical system included in a liquid crystal projector or the like. Accordingly, the "demagnification-conjugate side" is an equivalent of the "image side" in the case of an imaging optical system, or the "original-image side" in the case of a projection optical system. Hereinafter, the "magnification-conjugate side" and the "demagnification-conjugate side" are also referred to as the "front side" and the "rear side", respectively, for the sake of simplicity.

The total lens length L represents the total length of lens elements at a wide-angle end in a case where the optical system is a zoom lens system.

In a case where the optical system is a wide-angle lens system, the system includes, in order from the front side to the rear side, a front lens unit having a negative refractive power (an optical power, i.e., the reciprocal of focal length), an aperture stop, and a rear lens unit having a positive refractive power.

In the case where the optical system is a zoom lens system, the optical system includes a plurality of lens units including a first lens unit having a negative refractive power and provided nearest the front side. During zooming, intervals between adjacent ones of the plurality of lens units are changed.

Figure 1:
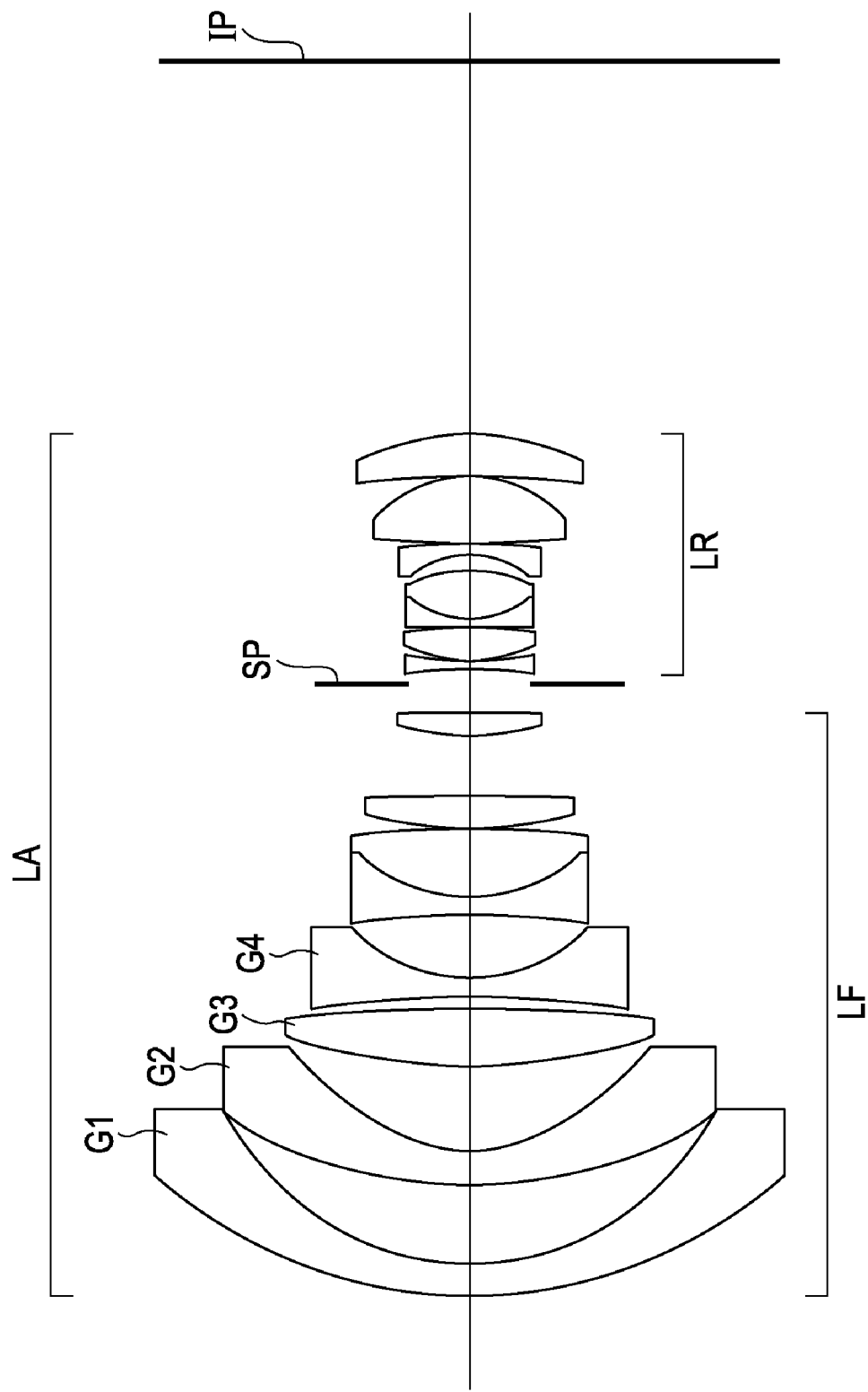
FIG. 1 is a cross-sectional view of an optical system according to a first embodiment of the present invention.
Figure 2:
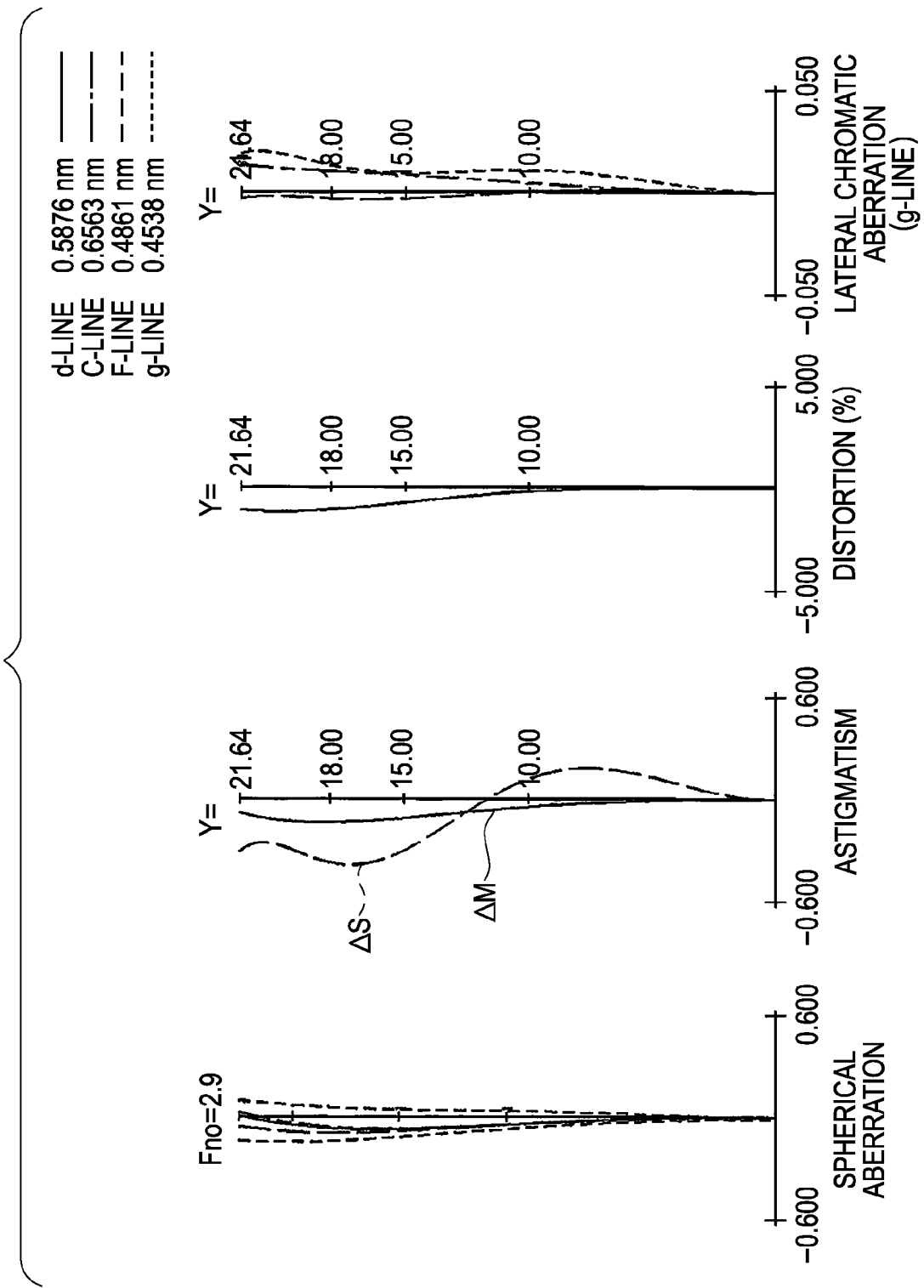
FIG. 2 shows diagrams of aberrations occurring in the optical system according to the first embodiment of the present invention.

FIG. 1 is a cross-sectional view of an optical system according to a first embodiment of the present invention. FIG. 2 shows aberration diagrams for an object at infinity in the first embodiment.

Figure 3:
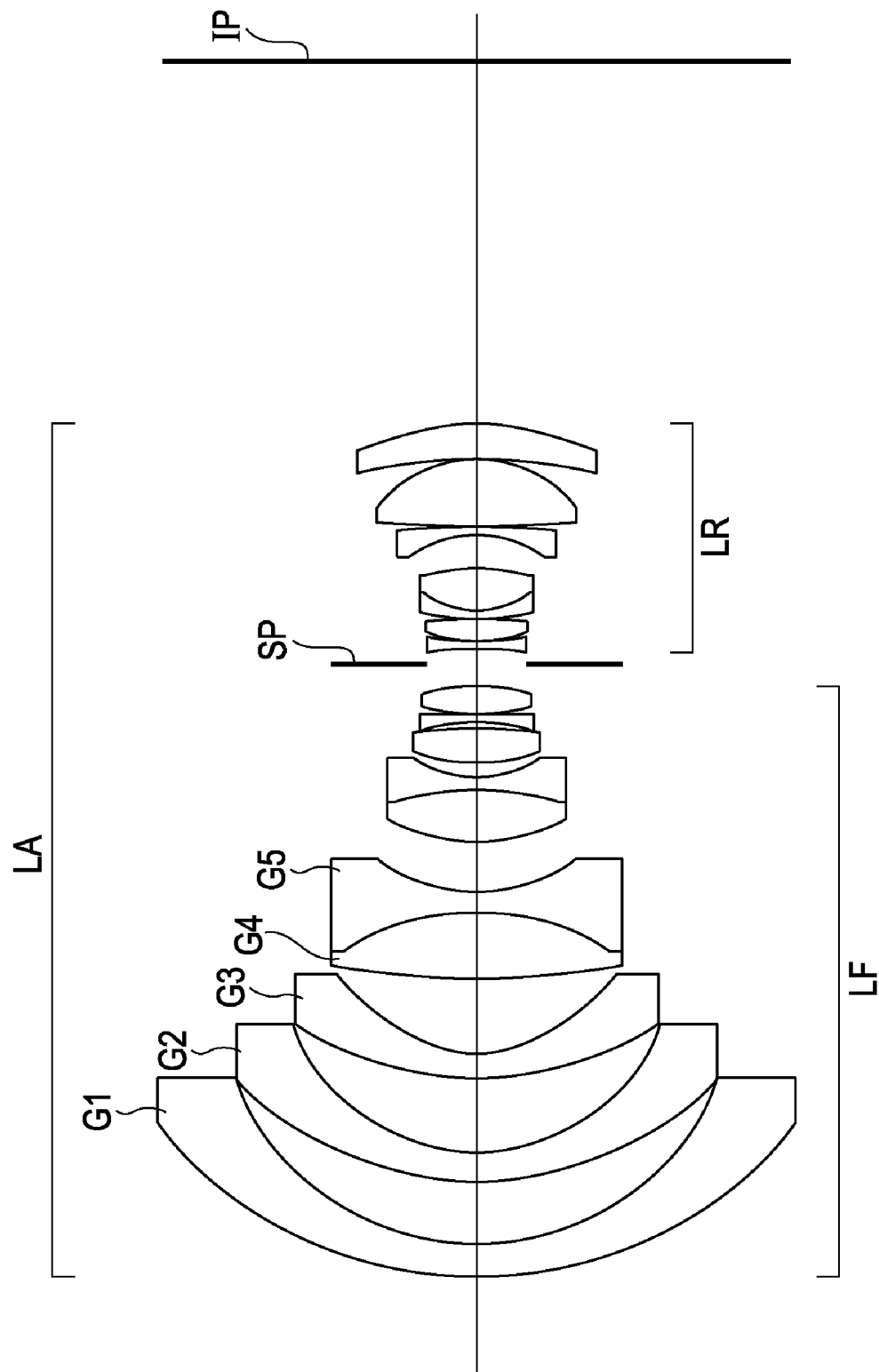
FIG. 3 is a cross-sectional view of an optical system according to a second embodiment of the present invention.
Figure 4:
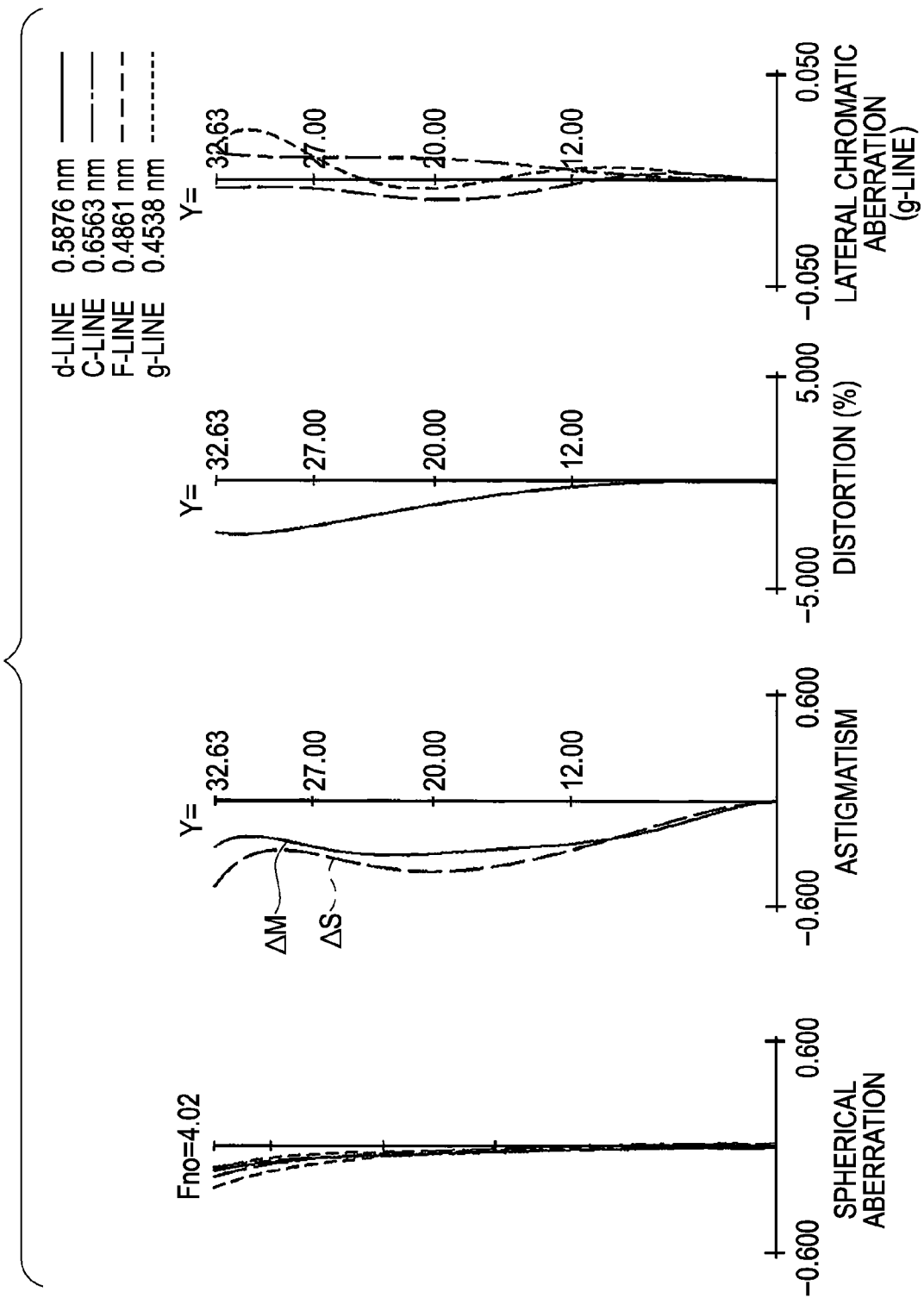
FIG. 4 shows diagrams of aberrations occurring in the optical system according to the second embodiment of the present invention.

FIG. 3 is a cross-sectional view of an optical system according to a second embodiment of the present invention. FIG. 4 shows aberration diagrams for an object at infinity in the second embodiment.

Figure 5:
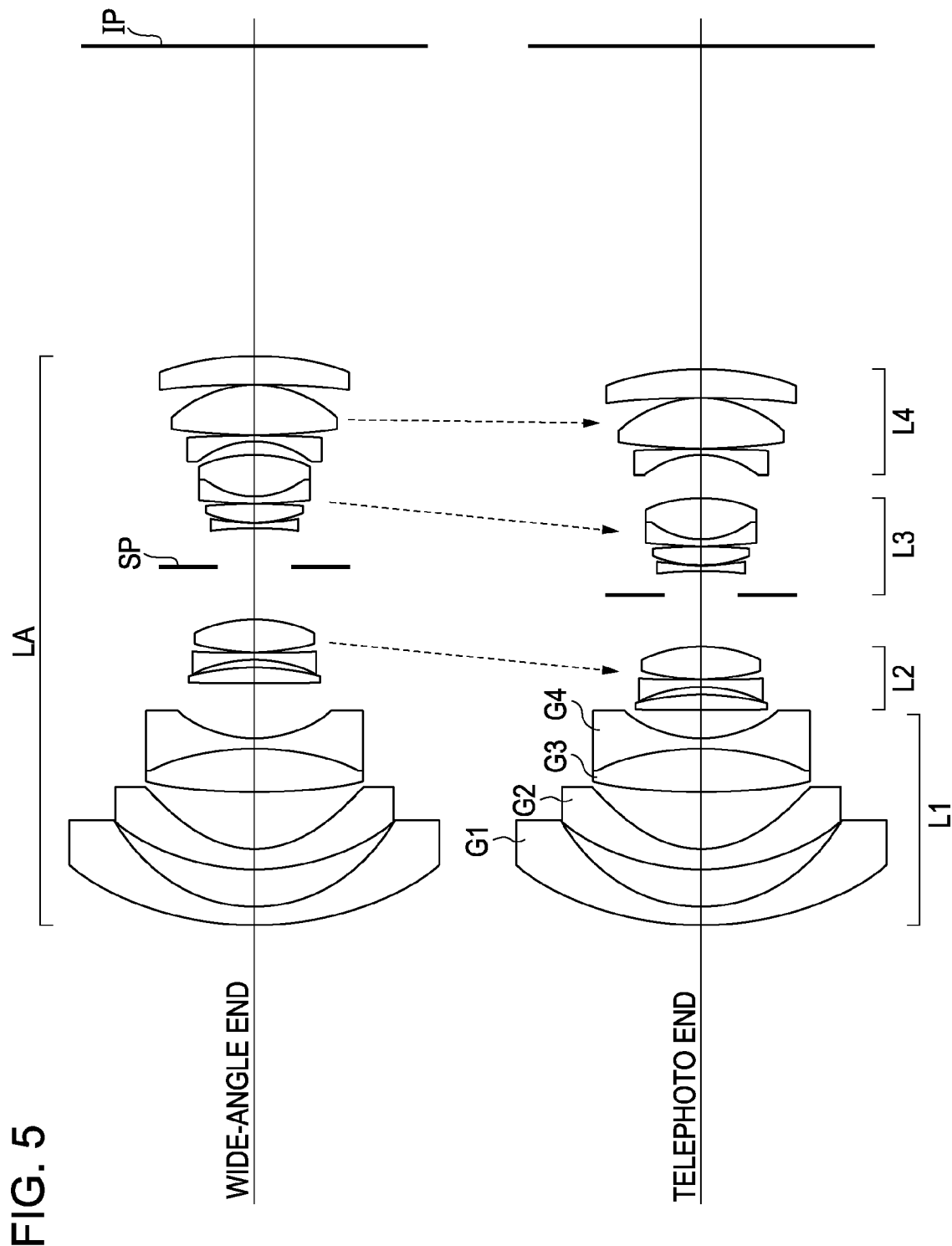
FIG. 5 is a cross-sectional view of an optical system according to a third embodiment of the present invention.

FIG. 5 shows an optical system according to a third embodiment of the present invention in cross-sectional views at a wide-angle end (short-focal-length end) and a telephoto end (long-focal-length end).

Figure 6:
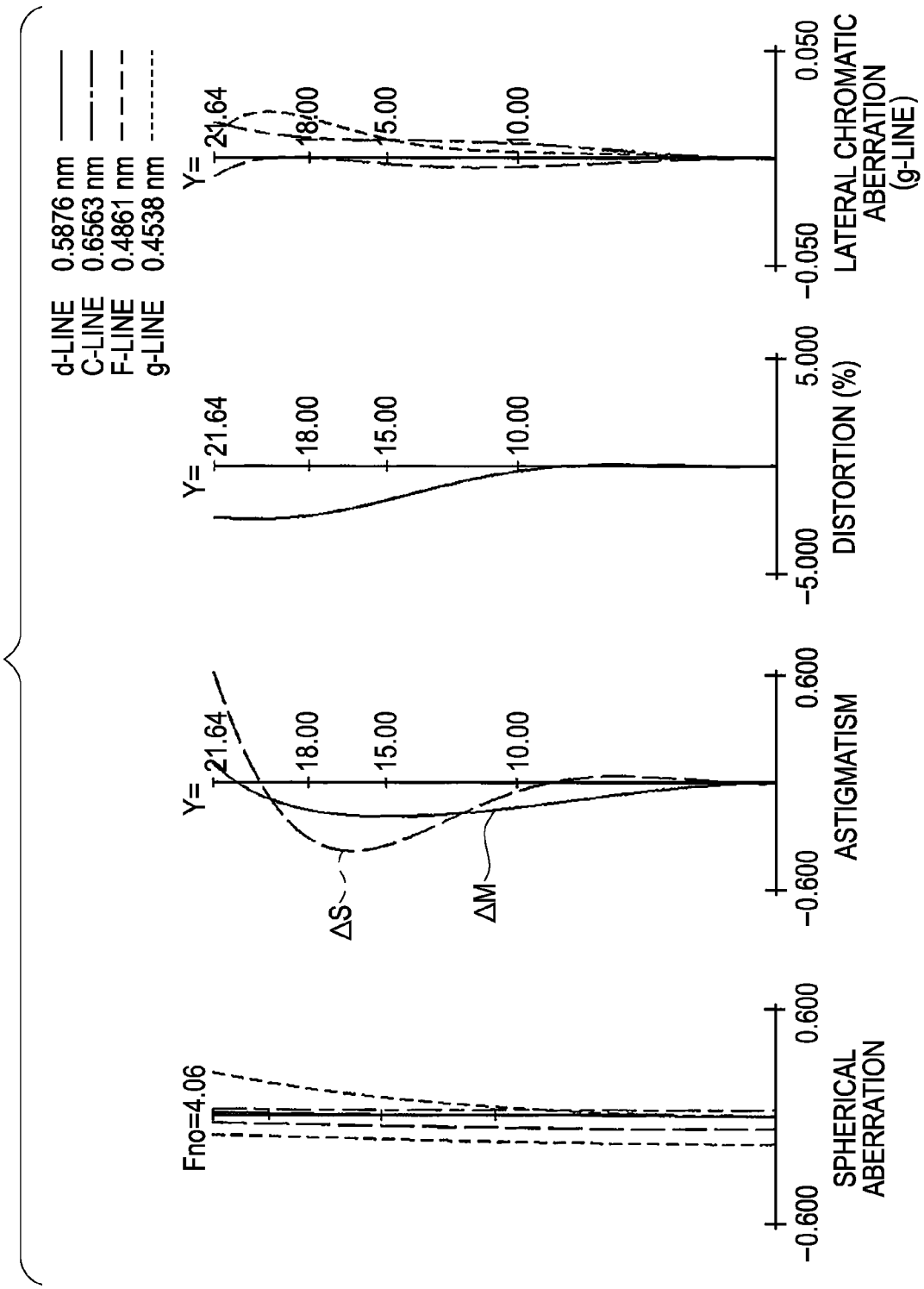
FIG. 6 shows diagrams of aberrations occurring in the optical system, at a wide-angle end, according to the third embodiment of the present invention.
Figure 7:
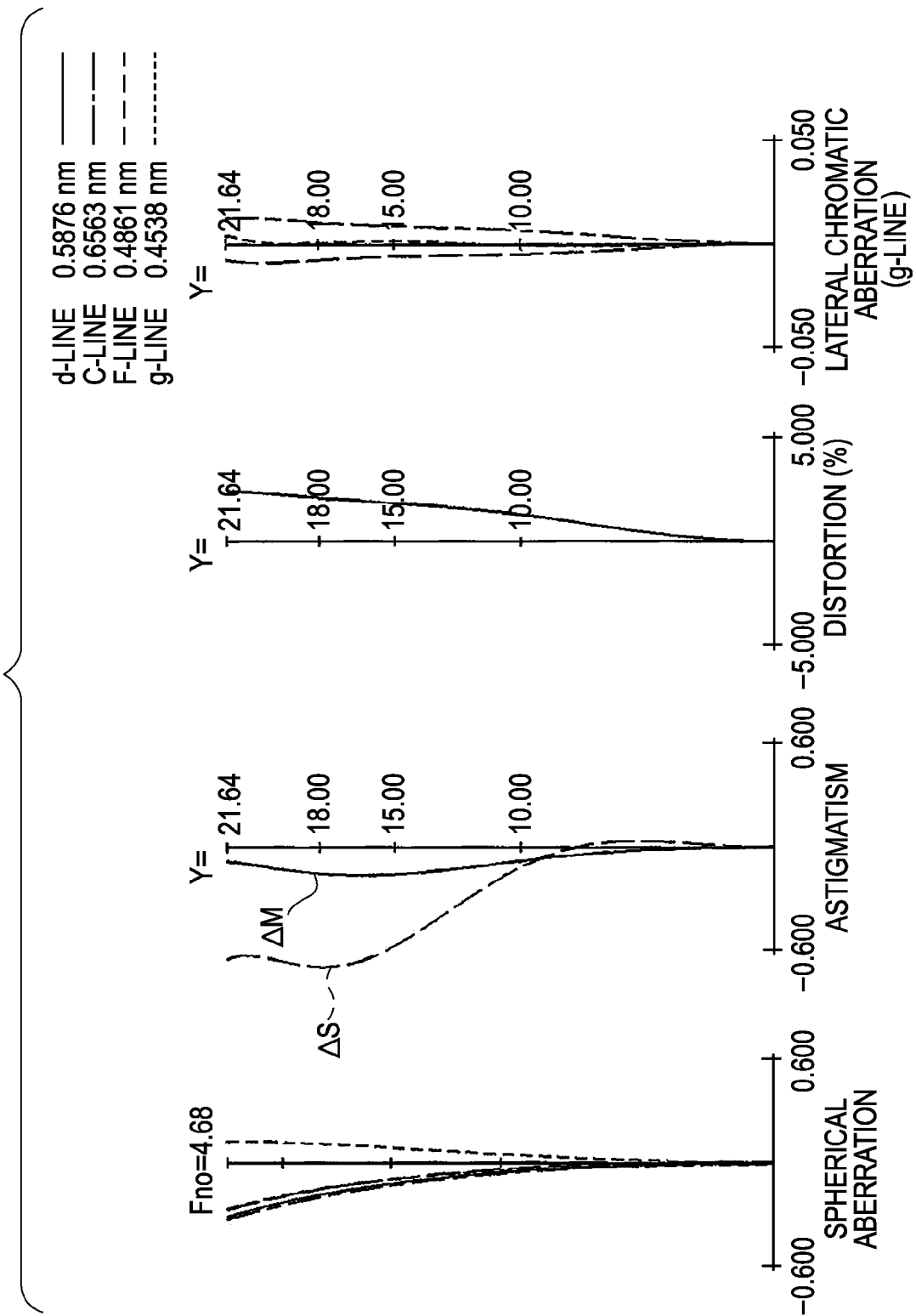
FIG. 7 shows diagrams of aberrations occurring in the optical system, at a telephoto end, according to the third embodiment of the present invention.

FIGS. 6 and 7 show aberration diagrams for an object at infinity in cases where the optical system according to the third embodiment is at the wide-angle end and at the telephoto end, respectively.

Figure 8:
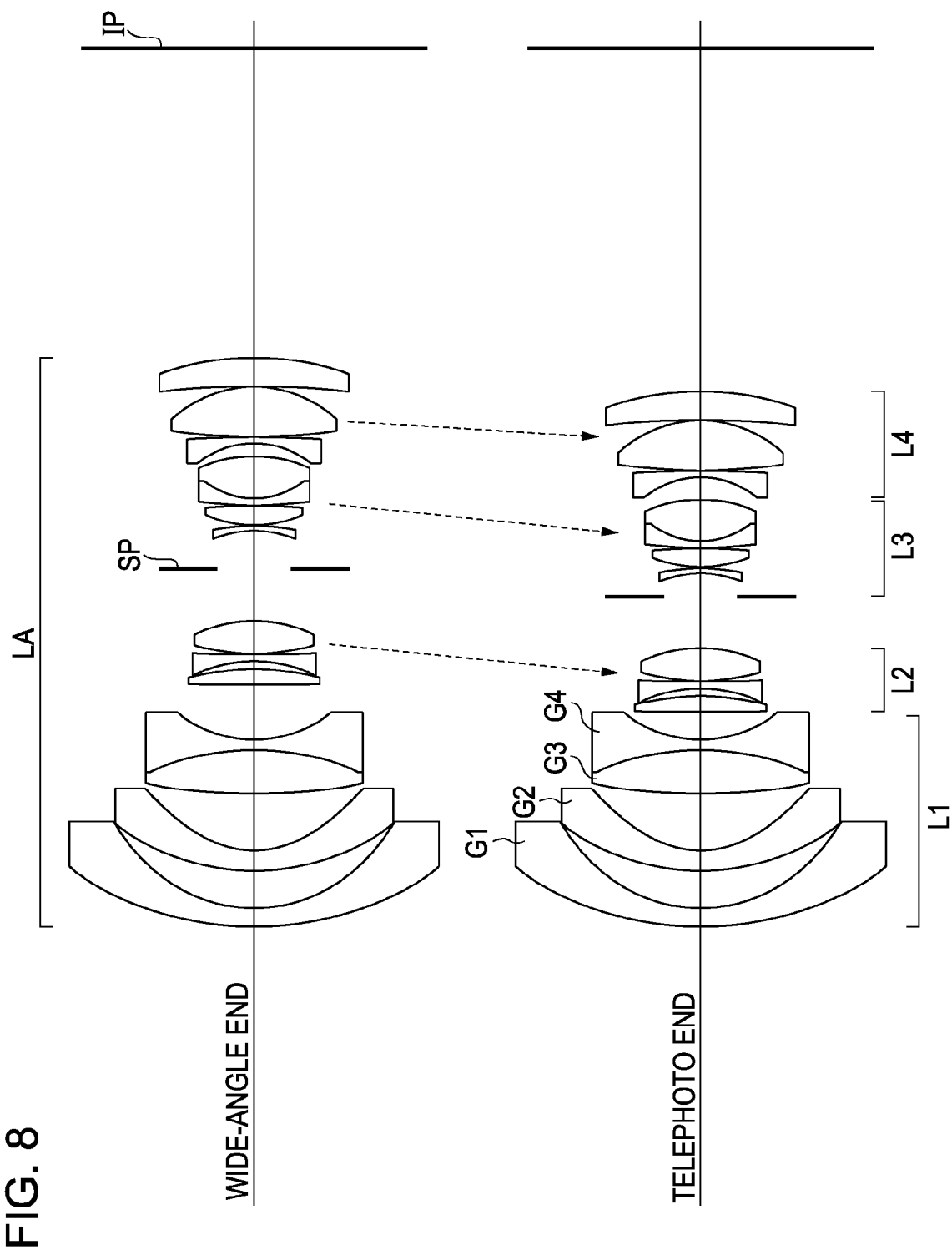
FIG. 8 is a cross-sectional view of an optical system according to a fourth embodiment of the present invention.

FIG. 8 shows an optical system according to a fourth embodiment of the present invention in cross-sectional views at a wide-angle end and a telephoto end.

Figure 9:
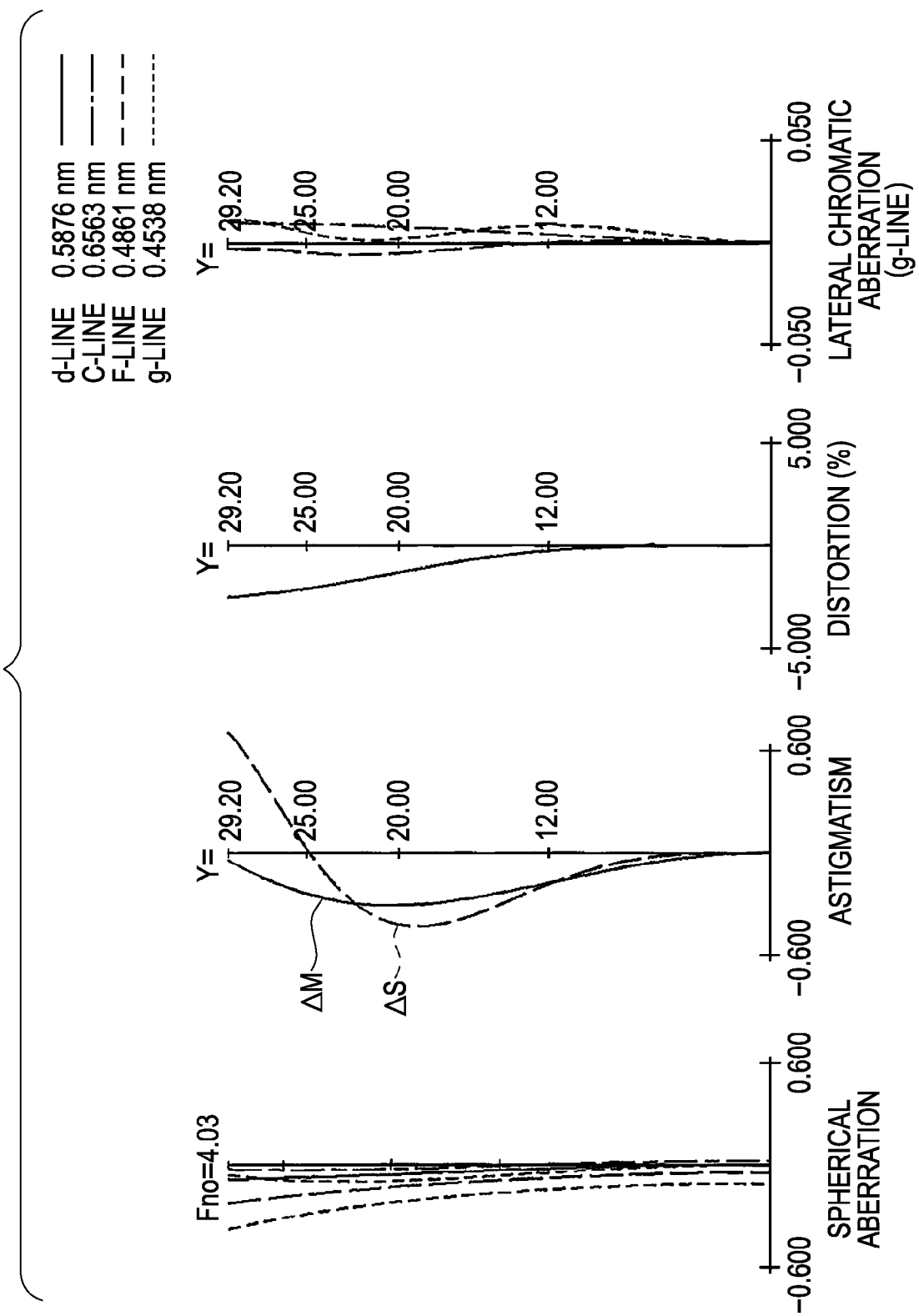
FIG. 9 shows diagrams of aberrations occurring in the optical system, at a wide-angle end, according to the fourth embodiment of the present invention.
Figure 10:
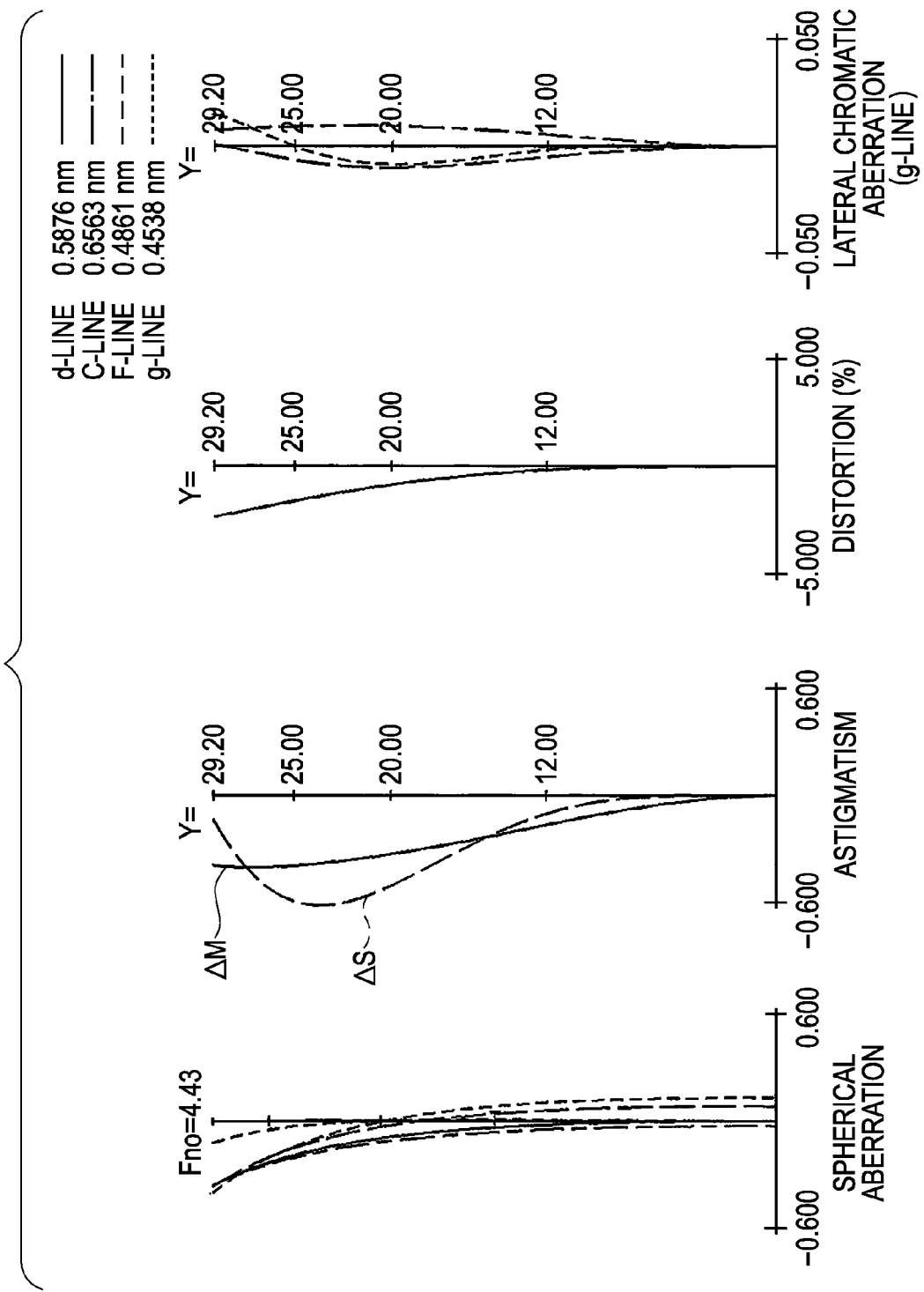
FIG. 10 shows diagrams of aberrations occurring in the optical system, at a telephoto end, according to the fourth embodiment of the present invention.

FIGS. 9 and 10 show aberration diagrams for an object at infinity in cases where the optical system according to the fourth embodiment is at the wide-angle end and at the telephoto end, respectively.

Figure 11:
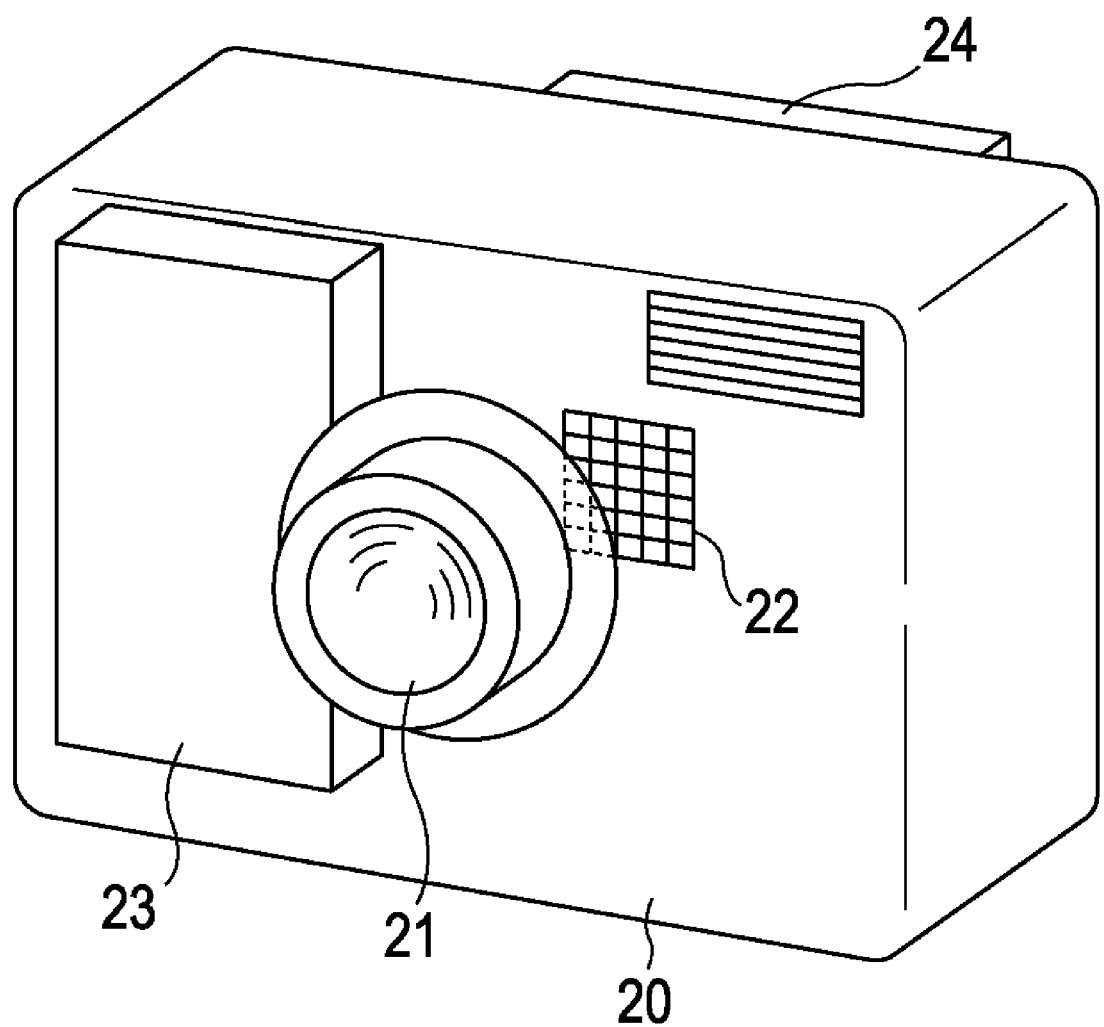
FIG. 11 schematically shows relevant parts of a camera according to a fifth embodiment of the present invention.

FIG. 11 schematically shows relevant parts of a digital camera (an optical apparatus) including the optical system according to any of the first to fourth embodiments of the present invention.

The optical system in each of the embodiments is an imaging lens system included in an optical apparatus such as a digital video camera or a video camera. In each cross-sectional view, an object resides on the left (front) side and an image is formed on the right (rear) side.

In the case where the optical system is included in a projector, a screen resides on the left side and an image is projected from the right side. In each cross-sectional view, the optical system is denoted as LA.

The optical systems according to the first and second embodiments shown in FIGS. 1 and 3, respectively, are each a wide-angle, single-focus lens system. Each of the optical systems shown in FIGS. 1 and 3 includes a front lens unit LF having a negative refractive power, and a rear lens unit LR having a positive refractive power.

The optical systems according to the third and fourth embodiments shown in FIGS. 5 and 8, respectively, are each a wide-angle zoom lens system. Each of the zoom lens systems LA shown in FIGS. 5 and 8 includes a first lens unit L1 having a negative refractive power, a second lens unit L2 having a positive refractive power, a third lens unit L3 having a positive refractive power, and a fourth lens unit L4 having a positive refractive power.

Referring to each of all the cross-sectional views, the optical system includes an aperture stop SP.

An image plane IP is an equivalent of the image pickup surface of a solid-state image pickup device (a photoelectric conversion element), such as a charge-coupled-device (CCD) sensor or a complementary-metal-oxide-semiconductor (CMOS) sensor, in a case where the optical system is an imaging optical system of a video camera or a digital still camera, or an equivalent of the film surface in a case where the optical system is an imaging optical system of a silver-halide-film camera. Relevant lens elements are denoted as G1 to G5, respectively.

The aberration diagrams for each of the embodiments include diagrams showing spherical aberration, astigmatism, distortion, and lateral chromatic aberration in that order from the left.

In each of the diagrams showing spherical aberration and lateral chromatic aberration, the solid line represents the d-line (587.6 nm), the alternate long and short dashed line represents the C-line (656.3 nm), the coarse broken line represents the F-line (486.1 nm), and the fine broken line represents the g-line (435.8 nm).

In the diagram showing astigmatism, the solid line represents $\Delta S$ in the sagittal direction for the d-line, and the broken line represents $\Delta M$ in the meridional direction for the d-line. The diagram showing distortion is for the d-line. The f-number is denoted as Fno, and the image height is denoted as Y.

The optical system according to each of the embodiments includes a first negative lens element provided nearest the front side. When the total lens length of the optical system is denoted as L, the optical system includes a first positive lens element at least whose front surface resides within a distance 0.4 L from the surface nearest the front side toward the rear side.

Regarding the material for the first negative lens element, when the refractive index for the d-line, the Abbe number for the d-line, and the partial dispersion ratio for the g- and F-lines are denoted as Ndn1, νdn1, and θgFn1, respectively, the material for the first negative lens element satisfies the following conditions:

$$Ndn1 > 1.65 \quad (1)$$

$$\theta gFn1 - (0.6438 - 0.001682 \times \nu dn1) > 0.001 \quad (2)$$

Further, regarding the material for the first positive lens element, when the refractive index for the d-line, the Abbe number for the d-line, and the partial dispersion ratio for the g- and F-lines are denoted as Ndp, νdp, and θgFp, respectively, the material for the first positive lens element satisfies the following conditions:

$$Ndp < 1.78 \quad (3)$$

$$\nu dp < 50 \quad (4)$$

$$\theta gFp - (0.6438 - 0.001682 \times \nu dp) < 0 \quad (5)$$

The Abbe number νd and the partial dispersion ratio θgF are respectively defined as follows:

$$\nu d = (Nd - 1)/(NF - NC)$$

$$\theta gF = (Ng - NF)/(NF - NC)$$

where Ng denotes the refractive index for the g-line (a wavelength of 435.8 nm), Nd denotes the refractive index for the d-line (a wavelength of 587.6 nm), NF denotes the refractive index for the F-line (a wavelength of 486.1 nm), and NC denotes the refractive index for the C-line (a wavelength of 656.3 nm). In each of the first to fourth embodiments, the first negative lens element corresponds to a meniscus negative lens element G1.

The first positive lens element corresponds to a biconvex positive lens element G3 in the first, third, and fourth embodiments, or a biconvex positive lens element G4 in the second embodiment.

To obtain a wide angle of view while suppressing the occurrence of distortion as much as possible, the first negative lens element can be provided in the form of a meniscus having a convex front surface and be positioned near the front side of the optical system, where the incident height h of a ray, among off-axis rays, passing through the center of the aperture stop is large.

A lens element having a weak power (a focal length 50 or more times longer than the total focal length of the lens system) provided nearest the front side has substantially little influence on various aberrations in the entirety of the lens system. Therefore, in a case where any lens elements having weak powers are provided nearest the front side, such lens elements are ignored and the lens element provided immediately after such lens elements is regarded as the lens element nearest the front side.

The first negative lens element composed of a material satisfying Conditional Expression (1) suppresses the occurrence of distortion and effectively produces a power that realizes a wide angle of view.

The first negative lens element composed of the foregoing material also suppresses increase in the angle formed between two lines connecting the center of surface curvature thereof and the upper and lower ends of the effective diameter thereof.

The first negative lens element composed of a material satisfying Conditional Expression (2) with a large second-order dispersion corrects lateral chromatic aberration for short wavelengths well.

If the lower limit defined in Conditional Expression (1) is violated, the surface curvature of the first negative lens element needs to be increased (i.e., the radius of curvature needs to be reduced) so that a strong negative power is obtained. In such a case, large distortion occurs and the angle formed between the aforementioned two lines increases. This increases the difficulty in manufacturing the lens element because, for example, accuracy in a polishing process and uniformity in an antireflection coating are reduced.

If the lower limit defined in Conditional Expression (2) is violated, the effect of correcting lateral chromatic aberration for short wavelengths is reduced. As a result, color blurring occurs, leading to a reduction in image quality.

A material satisfying both Conditional Expressions (1) and (2) has a relatively large first-order dispersion, that is, such a material does not usually have a sufficiently small first-order dispersion.

Therefore, in a negative lens element having a strong negative power, lateral chromatic aberration for wavelengths near the dominant wavelength (d-line), i.e., first-order lateral chromatic aberration, tends to be overcorrected.

To offset such an overcorrection, first-order lateral chromatic aberration can be effectively produced near the first negative lens element.

For this reason, the optical system of each embodiment includes the first positive lens element at least whose front surface resides within the distance 0.4 L (L denotes the total lens length of the optical system) from the surface nearest the front side. The material for the first positive lens element satisfies Conditional Expressions (3) to (5).

By satisfying Conditional Expressions (3) to (5), the first positive lens element effectively produces first-order lateral chromatic aberration, thereby offsetting the overcorrection of first-order lateral chromatic aberration in the first negative lens element. At the same time, occurrence of second-order dispersion in the first positive lens element is suppressed, whereby lateral chromatic aberration for short wavelengths is effectively corrected.

Within the distance 0.4 L from the surface nearest the front side, a sufficiently large incident height h of a ray, among off-axis rays, passing through the center of the aperture stop is obtained so that the first positive lens element can effectively have a high sensitivity in producing lateral chromatic aberration.

The first positive lens element composed of a material satisfying Conditional Expression (4) can effectively produce first-order lateral chromatic aberration.

The first positive lens element composed of a material satisfying Conditional Expression (3) can effectively produce first-order lateral chromatic aberration without ruining the angle of view obtained by a negative lens element having a weak power.

The first positive lens element composed of a material satisfying Conditional Expression (5) can correct lateral chromatic aberration for short wavelengths well.

If the first positive lens element is provided in such a manner that the front surface thereof resides beyond the distance 0.4 L, the incident height h of a ray, among off-axis rays, passing through the center of the aperture stop is insufficient.

This makes it difficult to produce a sufficient amount of first-order lateral chromatic aberration.

If the upper limit defined in Conditional Expression (4) is violated, it is also difficult to produce a sufficient amount of first-order lateral chromatic aberration.

If Conditional Expression (3) is violated, the positive power of the first positive lens element becomes too strong. This makes it difficult to effectively realize a wide angle of view.

If the upper limit defined in Conditional Expression (5) is violated, second-order dispersion occurring in the first positive lens element becomes too large. In such a case, the effect of correcting the second-order dispersion in the first negative lens element is cancelled out. As a result, color blurring occurs, leading to a reduction in image quality.

Now, more specific conditions for the configuration of the optical system, as a wide-angle lens system or a wide-angle zoom lens system, will be provided. The conditions provided below may not necessarily be satisfied. However, if these conditions are satisfied, a wide-angle lens system or a wide-angle zoom lens system can be provided more easily.

The optical system can include at least one aspherical surface provided within a distance 0.3 L from the surface nearest the front side.

With an aspherical surface provided within such a distance, distortion is corrected effectively, whereby it becomes easy to maintain the relationship of Y'=f·tan ω well.

Within the distance 0.3 L from the surface nearest the front side, a sufficiently large incident height h of a ray, among off-axis rays, passing through the center of the aperture stop is obtained so that distortion can be effectively corrected by the aspherical surface.

With the aspherical surface provided within such a distance, it becomes easier to effectively correct distortion occurring in the negative lens element.

If the aspherical surface resides beyond the distance 0.3 L, the incident height h at the aspherical surface is insufficient. Therefore, sufficient effect of correcting distortion cannot be obtained.

Separately from the first negative lens element, a second negative lens element can be provided in such a manner that at least the front surface thereof resides within a distance 0.5 L from the surface nearest the front side toward the rear side.

Regarding the material for the second negative lens element, when the Abbe number for the d-line and the partial dispersion ratio for the g- and F-lines are denoted as vdn2 and θgFn2, respectively, the material for the second negative lens element satisfies the following condition:

$$\theta gFn2-(0.6438-0.001682\times vdn2)>0.02 \qquad (6)$$

The optical systems in the first and third embodiments do not include any lens elements corresponding to the second negative lens element. In the second embodiment, the second negative lens element corresponds to a biconcave negative lens element G5, which is a part of a cemented lens. In the fourth embodiment, the second negative lens element corresponds to a biconcave negative lens element G4, which is also a part of a cemented lens.

If Conditional Expression (6) is satisfied, more effective correction of lateral chromatic aberration for short wavelengths can be realized easily.

Within the distance 0.5 L from the surface nearest the front side, a sufficiently large incident height h of a ray, among off-axis rays, passing through the center of the aperture stop is obtained so that the second negative lens element can have a sufficient sensitivity in correcting lateral chromatic aberration for short wavelengths.

The second negative lens element composed of a material satisfying Conditional Expression (6) can effectively correct lateral chromatic aberration for short wavelengths.

If the second negative lens element is provided in such a manner that the front surface thereof resides beyond the distance 0.5 L, the incident height h of a ray, among off-axis rays, passing through the center of the aperture stop is insufficient. This makes it difficult to produce a sufficient effect of correcting lateral chromatic aberration for short wavelengths.

If the lower limit defined in Conditional Expression (6) is violated, it is also difficult to produce a sufficient effect of correcting lateral chromatic aberration for short wavelengths.

More specifically, Conditional Expressions (1) to (6) can be set as follows:

$$Ndn1>1.70 \qquad (1a)$$

$$\theta gFn1-(0.6438-0.001682\times vdn1)>0.01 \qquad (2a)$$

$$Ndp<1.70 \qquad (3a)$$

$$vdp<45 \qquad (4a)$$

$$\theta gFp-(0.6438-0.001682\times vdp)<-0.001 \qquad (5a)$$

$$\theta gFn2-(0.6438-0.001682\times vdn2)>0.025 \qquad (6a)$$

Next, the optical systems according to the third and fourth embodiments shown in FIGS. 5 and 8, respectively, will be described.

The zoom lens systems of the third and fourth embodiments each include a first lens unit L1 having a negative refractive power at the position nearest the front side. On the rear side of the first lens unit L1, a second lens unit L2 having a positive refractive power, a third lens unit L3 having a positive refractive power, and a fourth lens unit 4 having a positive refractive power in that order.

The second to fourth lens units L2 to L4 move during zooming, whereby intervals between adjacent ones of the lens units change.

The zoom lens systems of the third and fourth embodiments are each a so-called negative-lead zoom lens system, in which the first lens unit L1 provided nearest the front side has a negative power.

In general, a positive-lead zoom lens system easily realizes a high zoom ratio but, if the angle of view is widened, the effective diameter of the first lens unit increases. Therefore, positive-lead zoom lens systems are not practical as wide-angle zoom lens systems whose full angle of view at the wide-angle end is larger than 80 degrees.

To realize a wide-angle zoom lens system, it is practical to use a negative-lead zoom lens system, although it is difficult to increase the zoom ratio.

Also in such a case, a wide-angle zoom lens system in which lateral chromatic aberration is corrected well can be realized if the first negative lens element and the first positive lens element are composed of appropriate materials and are provided at appropriate positions, respectively.

The wide-angle lens systems and the wide-angle zoom lens systems taken as the optical systems according to the embodiments of the present invention can be applied to optical apparatuses such as image pickup apparatuses, image projection apparatuses, and the like.

Next, the lens configuration of the optical system in each of the embodiments will be described.

The optical system according to a first embodiment includes, in order from the front side to the rear side, a meniscus negative lens element G1 having a convex front surface, a meniscus negative lens element G2 having a convex front surface and an aspherical rear surface, and a biconvex positive lens element G3.

The negative lens element G1 is composed of a material satisfying Conditional Expression (1). The negative lens element G1 is convex at the front surface thereof, where the incident height h of a ray, among off-axis rays, passing through the center of the aperture stop is large, thereby suppressing the occurrence of distortion and effectively producing a negative power (refractive power) for realizing a wide angle of view.

The negative lens element G1 also satisfies Conditional Expression (2), thereby effectively correcting lateral chromatic aberration for short wavelengths.

Like the negative lens element G1, the negative lens element G2 is convex at the front surface thereof, where the incident height h of a ray, among off-axis rays, passing through the center of the aperture stop is large, thereby suppressing the occurrence of distortion and effectively producing a negative power for realizing a wide angle of view.

The rear surface of the negative lens element G2 is aspherical and resides at a distance 0.167 L from the surface nearest the front side toward the rear side of the optical system.

Thus, the negative lens element G2 effectively corrects distortion at a position where the incident height h of a ray, among off-axis rays, passing through the center of the aperture stop is large.

The positive lens element G3 has the front surface thereof residing at a distance 0.265 L from the surface nearest the front side toward the rear side of the optical system and is composed of a material satisfying Conditional Expressions (3) to (5).

Thus, the positive lens element G3 effectively produces first-order lateral chromatic aberration as an offset of over-correction of first-order lateral chromatic aberration in the negative lens element G1 while suppressing the occurrence of lateral chromatic aberration for short wavelengths.

The optical system according to a second embodiment includes, from the front side to the rear side, two meniscus negative lens elements G1 and G2 each having a convex front surface, a meniscus negative lens element G3 having a convex front surface and an aspherical rear surface, and a cemented lens including a biconvex positive lens element G4 and a biconcave negative lens element G5.

The negative lens element G1 is composed of a material satisfying Conditional Expression (1), thereby producing the same advantageous effect as that produced by the negative lens element G1 of the first embodiment.

In the second embodiment, the negative lens element G2 produces the same advantageous effect as that produced by the negative lens element G1.

The negative lens element G3 has a convex front surface and an aspherical rear surface. The aspherical rear surface resides at a distance 0.263 L from the surface nearest the front side toward the rear side of the optical system.

Thus, the negative lens element G3 of the second embodiment produces the same advantageous effect as that produced by the negative lens element G2 of the first embodiment.

The positive lens element G4 has its front surface residing at a distance 0.350 L from the surface nearest the front side toward the rear side of the optical system and is composed of a material satisfying Conditional Expressions (3) to (5).

Thus, the positive lens element G4 of the second embodiment produces the same advantageous effect as that produced by the positive lens element G3 of the first embodiment.

The negative lens element G5 has its front surface residing at a distance 0.428 L from the surface nearest the front side toward the rear side of the optical system and is composed of a material satisfying Conditional Expression (6).

Thus, the negative lens element G5 effectively corrects lateral chromatic aberration for short wavelengths.

The optical system according to a third embodiment is a negative-lead, wide-angle zoom lens system and includes, in order from the front side to the rear side, a first lens unit L1 having a negative refractive power, a second lens unit L2 having a positive refractive power, a third lens unit L3 having a positive refractive power, and a fourth lens unit L4 having a positive refractive power. The second to fourth lens units L2 to L4 move during zooming as indicated by the respective arrows shown in FIG. 5.

The first lens unit L1 includes a meniscus negative lens element G1 having a convex front surface, a meniscus negative lens element G2 having a convex front surface and an aspherical rear surface, and a cemented lens including a biconvex positive lens element G3 and a biconcave negative lens element G4.

The negative lens element G1 is composed of a material satisfying Conditional Expressions (1) and (2), thereby producing the same advantageous effect as that produced by the negative lens element G1 of the first embodiment.

The negative lens element G2 has the convex front surface and the aspherical rear surface. At the wide-angle end, the aspherical rear surface resides at a distance 0.140 L from the surface nearest the front side toward the rear side of the optical system.

Thus, the negative lens element G2 of the third embodiment produces the same advantageous effect as that produced by the negative lens element G2 of the first embodiment.

At the wide-angle end, the positive lens element G3 has its front surface residing at a distance 0.227 L from the surface nearest the front side toward the rear side of the optical system and is composed of a material satisfying Conditional Expressions (3) to (5).

Thus, the positive lens element G3 of the third embodiment produces the same advantageous effect as that produced by the positive lens element G3 of the first embodiment.

The optical system according to a fourth embodiment is a negative-lead, wide-angle zoom lens system and includes, in order from the front side to the rear side, a first lens unit L1 having a negative refractive power, a second lens unit L2 having a positive refractive power, a third lens unit L3 having a positive refractive power, and a fourth lens unit L4 having a positive refractive power.

The second to fourth lens units L2 to L4 move during zooming as indicated by the respective arrows shown in FIG. 8.

The first lens unit L1 includes a meniscus negative lens element G1 having a convex front surface, a meniscus negative lens element G2 having a convex front surface and an aspherical rear surface, and a cemented lens including a biconvex positive lens element G3 and a biconcave negative lens element G4.

The negative lens element G1 is composed of a material satisfying Conditional Expressions (1) and (2), thereby producing the same advantageous effect as that produced by the negative lens element G1 of the first embodiment.

The negative lens element G2 has the convex front surface and the aspherical rear surface. At the wide-angle end, the aspherical rear surface resides at a distance 0.134 L from the surface nearest the front side toward the rear side of the optical system.

Thus, the negative lens element G2 of the fourth embodiment produces the same advantageous effect as that produced by the negative lens element G2 of the first embodiment.

At the wide-angle end, the positive lens element G3 has its front surface residing at a distance 0.235 L from the surface nearest the front side toward the rear side of the optical system and is composed of a material satisfying Conditional Expressions (3) to (5).

Thus, the positive lens element G3 of the fourth embodiment produces the same advantageous effect as that produced by the positive lens element G3 of the first embodiment.

At the wide-angle end, the negative lens element G4 has its front surface residing at a distance 0.310 L from the surface nearest the front side toward the rear side of the optical system and is composed of a material satisfying Conditional Expression (6).

Thus, the negative lens element G4 of the fourth embodiment produces the same advantageous effect as that produced by the negative lens element G5 of the second embodiment.

The embodiments as wide-angle lens systems and wide-angle zoom lens systems suitable as the optical system of the present invention have been described. The optical system of the present invention is not limited to these embodiments, and various modifications and changes can be made thereto within the scope of the invention.

In each of the embodiments, the optical system includes a lens element or a lens unit generally having a positive refractive power at a position near the rear side. With such a configuration, a retrofocus optical system having both a wide angle of view and a long back focus is realized.

Next, an embodiment as a digital still camera, a fifth embodiment, including the optical system according to any of the first to fourth embodiments as an imaging optical system will be described with reference to FIG. 11.

Referring to FIG. 11, the digital still camera includes a body 20, an imaging optical system 21, which is the optical system according to any of the first to fourth embodiments, and a solid-state image pickup device (photoelectric conversion element) 22, such as a CCD sensor or a CMOS sensor, mounted inside the body 20 and receiving an image of an object formed by the imaging optical system 21.

The digital still camera further includes a memory 23 that stores information, representing the image of the object, obtained from photoelectric conversion performed by the solid-state image pickup device 22, and a viewfinder 24, such as a liquid crystal display panel, through which the image of the object formed on the solid-state image pickup device 22 is observed.

By applying the optical system according to any of the first to fourth embodiments of the present invention to a digital still camera, a compact optical apparatus having high optical performance can be provided.

The optical system according to any of the first to fourth embodiments of the present invention can also be applied, as a projection lens system, to an image projection apparatus (projector).

Numerical Examples (lens data) 1 to 4 corresponding to the first to fourth embodiments, respectively, will be shown below.

In Numerical Examples 1 to 4, the surface number indicates the order of each surface counted from the front side. For each of the optical surfaces, the radius of curvature r and the interval d between optical surfaces are shown. For each of the optical members, the refractive index nd for the d-line, the Abbe number vd for the d-line, and the partial dispersion amount X for the g- and F-lines are shown.

Note that the partial dispersion amount X is expressed as follows:

$$X = \theta gF - (0.6438 - 0.001682 \times vd)$$

Optical surfaces each shown with "*" (an asterisk) are aspherical surfaces.

For each of the aspherical surfaces, when a surface position in the optical-axis direction at a distance R from the optical axis in a direction perpendicular to the optical axis is denoted as Sag (R), the aspherical surface has a shape satisfying the following relationship:

$$Sag(R) = \frac{(1/r) \times R^2}{1 + \sqrt{1 - (1+K) \times (1/r)^2 \times R^2}} + A4 \times R^4 + A6 \times R^6 + A8 \times R^8 + A10 \times R^{10}$$

Aspherical coefficients of the respective aspherical surfaces are also shown in Numerical Examples, where "E-N" represents "$\times 10^{-N}$"

In addition, the focal length is denoted as f, the f-number is denoted as FNO, the angle of view is denoted as ω, the image height is denoted as Y', the total length from the surface nearest the front side (the first lens surface) to the surface nearest the rear side (the final lens surface) of the lens system is denoted as L, and the length from the final surface of the optical system to the image plane is denoted as BF.

For each of the zoom lens systems according to the third and fourth embodiments, values are shown for each of focal lengths f at three positions: the wide-angle end, the middle zoom position, and the telephoto end.

Intervals d between optical surfaces that vary during zooming are each shown as "variable". Such intervals d are summarized separately also for each of the focal lengths f at the wide-angle end, the middle zoom position, and the telephoto end.

The relationships between Conditional Expressions provided above and values in Numerical Examples are summarized in Table 1.

Numerical Example 1

| Surface No. | Surface Data | | | | |
|---|---|---|---|---|---|
| | r | d | nd | vd | X |
| 1 | 50.3471 | 3.50 | 1.80518 | 25.4 | 0.0151 |
| 2 | 29.3671 | 8.54 | | | |
| 3 | 51.3387 | 3.50 | 1.58312 | 59.4 | −0.0016 |
| 4* | 16.0862 | 9.14 | | | |
| 5 | 60.7996 | 6.27 | 1.65411 | 39.7 | −0.0034 |
| 6 | −157.9678 | 1.24 | | | |
| 7 | −111.3574 | 2.00 | 1.60311 | 60.6 | −0.0003 |
| 8 | 17.1852 | 6.91 | | | |

-continued

| | | | | | |
|---|---|---|---|---|---|
| 9 | −80.2956 | 2.00 | 1.60311 | 60.6 | −0.0003 |
| 10 | 17.4553 | 7.20 | 1.65411 | 39.7 | −0.0034 |
| 11 | −130.8727 | 0.15 | | | |
| 12 | 41.4919 | 3.51 | 1.69894 | 30.1 | 0.0099 |
| 13 | −427.9398 | 6.44 | | | |
| 14 | 26.4145 | 2.46 | 1.58267 | 46.4 | 0.0014 |
| 15 | 9153.9089 | 3.18 | | | |
| 16 (Stop) | | 1.34 | | | |
| 17 | −72.7688 | 1.00 | 1.83480 | 42.7 | −0.0078 |
| 18 | 32.6144 | 0.15 | | | |
| 19 | 16.2812 | 3.39 | 1.59270 | 35.3 | 0.0089 |
| 20 | −47.1917 | 0.15 | | | |
| 21 | 338.4792 | 1.00 | 1.83400 | 37.2 | −0.0037 |
| 22 | 10.4916 | 5.16 | 1.49700 | 81.5 | 0.0309 |
| 23 | −15.6629 | 1.61 | | | |
| 24 | −10.4890 | 1.20 | 1.83400 | 37.2 | −0.0037 |
| 25 | −88.1324 | 0.15 | | | |
| 26 | 78.3131 | 7.18 | 1.49700 | 81.5 | 0.0309 |
| 27 | −13.9705 | 0.15 | | | |
| 28 | −69.8214 | 4.50 | 1.58312 | 59.4 | −0.0016 |
| 29* | −23.1579 | | | | |

Aspherical Surface Data

| Surface No. | K | A4 | A6 | A8 | A10 |
|---|---|---|---|---|---|
| 4 | −8.31168E−01 | −5.87680E−06 | −2.09911E−09 | −2.83619E−11 | 1.58639E−14 |
| 29 | 0.00000E+00 | 2.12768E−05 | −1.43503E−08 | 4.82905E−10 | −5.43468E−13 |

Miscellaneous Data

| | |
|---|---|
| f | 14.20 |
| FNO | 2.90 |
| Angle of view ω | 57.20 |
| Image height Y' | 21.64 |
| Total length L | 93.00 |
| BF | 40.30 |

Note:
X = θgF − (0.6438 − 0.001682 × vd)

Numerical Example 2

Surface Data

| Surface No. | r | d | nd | vd | X |
|---|---|---|---|---|---|
| 1 | 55.4116 | 4.50 | 1.78472 | 25.7 | 0.0155 |
| 2 | 34.9965 | 8.63 | | | |
| 3 | 46.3673 | 4.00 | 1.74949 | 35.3 | 0.0024 |
| 4 | 26.2458 | 10.13 | | | |
| 5 | 44.5170 | 3.50 | 1.58312 | 59.4 | −0.0016 |
| 6* | 16.1517 | 10.09 | | | |
| 7 | 109.1269 | 9.12 | 1.65411 | 39.7 | −0.0034 |
| 8 | −35.8060 | 2.80 | 1.49700 | 81.5 | 0.0309 |
| 9 | 22.4950 | 6.88 | | | |
| 10 | 24.0261 | 6.99 | 1.65411 | 39.7 | −0.0034 |
| 11 | −37.8370 | 1.80 | 1.60311 | 60.6 | −0.0003 |
| 12 | 14.9686 | 1.88 | | | |
| 13 | 23.1685 | 4.84 | 1.62588 | 35.7 | 0.0055 |
| 14 | −56.8406 | 0.63 | | | |
| 15 | −28.8248 | 1.20 | 1.83400 | 37.2 | −0.0037 |
| 16 | 1501.6599 | 0.20 | | | |
| 17 | 33.9320 | 3.77 | 1.51742 | 52.4 | 0.0008 |
| 18 | −24.8489 | 2.88 | | | |
| 19 (Stop) | | 2.07 | | | |
| 20 | −50.9991 | 1.00 | 1.83400 | 37.2 | −0.0037 |
| 21 | 33.8538 | 0.15 | | | |
| 22 | 17.6293 | 2.91 | 1.59270 | 35.3 | 0.0089 |
| 23 | −92.1092 | 0.20 | | | |
| 24 | 35.1209 | 1.00 | 1.83400 | 37.2 | −0.0037 |
| 25 | 11.0695 | 5.79 | 1.49700 | 81.5 | 0.0309 |
| 26 | −25.4903 | 4.43 | | | |

-continued

| | | | | | |
|---|---|---|---|---|---|
| 27 | −14.9581 | 1.20 | 1.83400 | 37.2 | −0.0037 |
| 28 | −119.6868 | 0.15 | | | |
| 29 | 145.0957 | 8.92 | 1.49700 | 81.5 | 0.0309 |
| 30 | −17.5215 | 0.15 | | | |
| 31 | −56.4604 | 5.00 | 1.58312 | 59.4 | −0.0016 |
| 32* | −27.6583 | | | | |

Aspherical Surface Data

| Surface No. | K | A4 | A6 | A8 | A10 |
|---|---|---|---|---|---|
| 6 | −1.03337E+00 | −3.01610E−06 | −1.75946E−10 | 2.83614E−12 | −2.07198E−14 |
| 32 | 0.00000E+00 | 1.37800E−05 | 1.89914E−08 | −3.65199E−12 | 3.56919E−14 |

Miscellaneous Data

| | |
|---|---|
| f | 17.20 |
| FNO | 4.02 |
| Angle of view ω | 62.90 |
| Image height Y' | 32.64 |
| Total length L | 116.82 |
| BF | 50.00 |

Note:
$X = \theta gF - (0.6438 - 0.001682 \times \nu d)$

Numerical Example 3

Surface Data

| Surface No. | r | d | nd | νd | X |
|---|---|---|---|---|---|
| 1 | 49.1129 | 3.20 | 1.80518 | 25.4 | 0.0151 |
| 2 | 25.1416 | 7.22 | | | |
| 3 | 44.0146 | 3.50 | 1.58312 | 59.4 | −0.0016 |
| 4* | 15.2219 | 8.67 | | | |
| 5 | 76.4343 | 7.00 | 1.65411 | 39.7 | −0.0034 |
| 6 | −41.5098 | 1.80 | 1.60311 | 60.6 | −0.0003 |
| 7 | 20.6140 | (Variable) | | | |
| 8 | −126.8003 | 3.09 | 1.72825 | 28.5 | 0.0118 |
| 9 | −27.6428 | 1.57 | | | |
| 10 | −19.4369 | 1.20 | 1.60311 | 60.6 | −0.0003 |
| 11 | −68.1078 | 0.20 | | | |
| 12 | 59.8159 | 4.14 | 1.51742 | 52.4 | 0.0008 |
| 13 | −25.5672 | (Variable) | | | |
| 14 (Stop) | | 3.98 | | | |
| 15 | −60.8323 | 1.00 | 1.83480 | 42.7 | −0.0078 |
| 16 | 32.9555 | 0.20 | | | |
| 17 | 20.4308 | 2.60 | 1.59270 | 35.3 | 0.0089 |
| 18 | −88.3811 | 0.20 | | | |
| 19 | 24.3987 | 1.00 | 1.83400 | 37.2 | −0.0037 |
| 20 | 12.2001 | 6.19 | 1.49700 | 81.5 | 0.0309 |
| 21 | −28.7101 | (Variable) | | | |
| 22 | −16.6417 | 1.20 | 1.83400 | 37.2 | −0.0037 |
| 23 | 345.6984 | 0.15 | | | |
| 24 | 49.8097 | 8.19 | 1.49700 | 81.5 | 0.0309 |
| 25 | −19.4123 | 0.15 | | | |
| 26 | −123.5357 | 5.00 | 1.58312 | 59.4 | −0.0016 |
| 27* | −29.2968 | | | | |

Aspherical Surface Data

| Surface No. | K | A4 | A6 | A8 | A10 |
|---|---|---|---|---|---|
| 4 | −6.90968E−01 | −9.93430E−06 | 1.21449E−08 | −9.04500E−12 | −1.22831E−13 |
| 27 | 0.00000E+00 | 1.94047E−05 | 1.10687E−08 | 8.70154E−11 | 1.06390E−13 |

Miscellaneous Data

| | | | |
|---|---|---|---|
| Zoom ratio | | 1.29 | |
| f | 14.00 | 16.00 | 18.00 |
| FNO | 4.06 | 4.41 | 4.68 |
| Angle of view ω | 57.80 | 53.40 | 49.60 |

-continued

|  |  |  |  |
|---|---|---|---|
| Image height Y' | 21.64 | 21.64 | 21.64 |
| Total length L | 99.70 | 99.45 | 96.80 |
| BF | 40.32 | 40.57 | 43.22 |
| d7 | 11.37 | 8.07 | 5.16 |
| d13 | 14.84 | 13.10 | 10.79 |
| d21 | 2.05 | 6.83 | 9.40 |

Zoom Unit Data

| Unit | Front surface | f |
|---|---|---|
| 1 | 1 | −13.49 |
| 2 | 8 | 36.66 |
| 3 | 14 | 46.24 |
| 4 | 22 | 93.86 |

Note:
$X = \theta gF - (0.6438 - 0.001682 \times vd)$

Numerical Example 4

Surface Data

| Surface No. | r | d | nd | vd | X |
|---|---|---|---|---|---|
| 1 | 54.2893 | 3.20 | 1.80518 | 25.4 | 0.0151 |
| 2 | 26.7895 | 6.31 |  |  |  |
| 3 | 39.4065 | 3.50 | 1.58312 | 59.4 | −0.0016 |
| 4* | 16.6215 | 9.84 |  |  |  |
| 5 | 98.0230 | 7.28 | 1.65411 | 39.7 | −0.0034 |
| 6 | −45.6949 | 1.80 | 1.49700 | 81.5 | 0.0309 |
| 7 | 20.8125 | (Variable) |  |  |  |
| 8 | 248.3695 | 2.68 | 1.69894 | 30.1 | 0.0099 |
| 9 | −55.8964 | 1.24 |  |  |  |
| 10 | −26.7992 | 1.20 | 1.60311 | 60.6 | −0.0003 |
| 11 | 112.2228 | 0.20 |  |  |  |
| 12 | 27.8581 | 5.60 | 1.56732 | 42.8 | 0.0013 |
| 13 | −42.2473 | (Variable) |  |  |  |
| 14 (Stop) |  | 6.57 |  |  |  |
| 15 | −18.0203 | 1.00 | 1.83480 | 42.7 | −0.0078 |
| 16 | −28.9891 | 0.20 |  |  |  |
| 17 | 21.0709 | 3.23 | 1.59270 | 35.3 | 0.0089 |
| 18 | −77.2625 | 0.20 |  |  |  |
| 19 | 71.3160 | 1.00 | 1.83400 | 37.2 | −0.0037 |
| 20 | 13.7405 | 6.90 | 1.49700 | 81.5 | 0.0309 |
| 21 | −26.1837 | (Variable) |  |  |  |
| 22 | −16.4391 | 1.20 | 1.83400 | 37.2 | −0.0037 |
| 23 | −1319.2816 | 0.15 |  |  |  |
| 24 | 80.3852 | 8.37 | 1.49700 | 81.5 | 0.0309 |
| 25 | −21.2473 | 0.15 |  |  |  |
| 26 | −139.1281 | 5.00 | 1.58312 | 59.4 | −0.0016 |
| 27* | −35.0542 |  |  |  |  |

Aspherical Surface Data

| Surface No. | K | A4 | A6 | A8 | A10 |
|---|---|---|---|---|---|
| 4 | −6.89411E−01 | −6.16803E−06 | −4.02365E−09 | 3.58952E−12 | −3.26135E−14 |
| 27 | 0.00000E+00 | 1.32233E−05 | 1.07894E−08 | 4.25477E−11 | −4.99818E−14 |

Miscellaneous Data

|  |  |  |  |
|---|---|---|---|
| Zoom ratio |  | 1.2 |  |
| f | 20.00 | 22.00 | 24.00 |
| FNO | 4.03 | 4.23 | 4.43 |
| Angle of view ω | 56.30 | 53.70 | 51.30 |
| Image height Y' | 29.20 | 29.20 | 29.20 |
| Total length L | 97.30 | 94.05 | 91.11 |
| BF | 52.77 | 56.02 | 58.96 |
| d7 | 9.29 | 6.51 | 4.39 |
| d13 | 6.57 | 5.38 | 3.79 |
| d21 | 2.22 | 2.94 | 3.70 |

-continued

Zoom Unit Data

| Unit | Front surface | f |
|---|---|---|
| 1 | 1 | −17.12 |
| 2 | 8 | 47.90 |
| 3 | 15 | 39.32 |
| 4 | 22 | 292.99 |

Note:
X = θgF − (0.6438 − 0.001682 × vd)

TABLE 1

|  | Example 1 | Example 2 | Example 3 | Example 4 |
|---|---|---|---|---|
| Expression (1) | 1.80518 | 1.78472 | 1.80518 | 1.80518 |
| Expression (2) | 0.0151 | 0.0155 | 0.0151 | 0.0151 |
| Expression (3) | 1.65411 | 1.65411 | 1.65411 | 1.65411 |
| Expression (4) | 39.7 | 39.7 | 39.7 | 39.7 |
| Expression (5) | −0.0034 | −0.0034 | −0.0034 | −0.0034 |
| Expression (6) | None | 0.0309 | None | 0.0309 |

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-339240 filed Dec. 28, 2007, which is hereby incorporated by reference herein in its entirety.

What is claimed is:

1. An optical system comprising:
a first negative lens element disposed nearest a front side; and
a first positive lens element whose front surface resides within a distance 0.4 L from a surface nearest the front side toward a rear side of the optical system having a total lens length L,
wherein the first negative lens element is composed of a material satisfying the following conditions:

$Ndn1 > 1.65$ $θgFn1 − (0.6438 − 0.001682 × vdn1) > 0.001$ where $Ndn1$, $vdn1$, and $θgFn1$ denote a refractive index for the d-line, an Abbe number for the d-line, and a partial dispersion ratio for the g- and F-lines, respectively, of the material of the first negative lens element, and
wherein the first positive lens element is composed of a material satisfying the following conditions:

$Ndp < 1.78$ $vdp < 50$ $θgFp − (0.6438 − 0.001682 × vdp) < 0$ where $Ndp$, $vdp$, and $θgFp$ denote a refractive index for the d-line, an Abbe number for the d-line, and a partial dispersion ratio for the g- and F-lines, respectively, of the material of the first positive lens element.

2. The optical system according to claim 1, further comprising:
an aspherical surface provided within a distance 0.3 L from the surface nearest the front side toward the rear side.

3. The optical system according to claim 1, further comprising:
a second negative lens element whose front surface resides within a distance 0.5 L from the surface nearest the front side toward the rear side,
wherein the second negative lens element is composed of a material satisfying the following condition:

$θgFn2 − (0.6438 − 0.001682 × vdn2) > 0.02$ where $vdn2$ and $θgFn2$ denote an Abbe number for the d-line and a partial dispersion ratio for the g- and F-lines, respectively, of the material of the second negative lens element.

4. The optical system according to claim 1, further comprising, in order from the front side to the rear side:
a front lens unit having a negative optical power;
an aperture stop; and
a rear lens unit having a positive optical power,
wherein the front lens unit includes the first negative lens element and the first positive lens element.

5. The optical system according to claim 1, further comprising:
a plurality of lens units including a first lens unit having a negative optical power and residing at the position nearest the front side,
wherein intervals between adjacent ones of the plurality of lens units change during zooming, and
wherein the total lens length L is a total lens length of the optical system at a wide-angle end.

6. The optical system according to claim 5,
wherein the plurality of lens units includes, in order from the front side to the rear side, the first lens unit, a second lens unit having a positive optical power, a third lens unit having a positive optical power, and a fourth lens unit having a positive optical power, and
wherein the second lens unit, the third lens unit, and the fourth lens unit move during zooming.

7. An optical apparatus comprising:
the optical system according to claim 1.

* * * * *